(12) United States Patent
Kumar et al.

(10) Patent No.: US 6,611,648 B2
(45) Date of Patent: Aug. 26, 2003

(54) OPTICAL FIBERS HAVING CORES WITH DIFFERENT PROPAGATION CONSTANTS, AND METHODS OF MANUFACTURING SAME

(75) Inventors: Shiva Kumar, Painted Post, NY (US); Upendra H. Manyam, Corning, NY (US); Vaidyanathan Srikant, Ithaca, NY (US)

(73) Assignee: Corning Incorporated, Corning, NY (US)

( * ) Notice: Subject to any disclaimer, the term of this patent is extended or adjusted under 35 U.S.C. 154(b) by 63 days.

(21) Appl. No.: 09/852,173

(22) Filed: May 9, 2001

(65) Prior Publication Data

US 2002/0176677 A1 Nov. 28, 2002

(51) Int. Cl.⁷ ................................................ G02B 6/02
(52) U.S. Cl. ........................................ 385/126; 385/123
(58) Field of Search .................................. 385/126, 123

(56) References Cited

U.S. PATENT DOCUMENTS

| | | | | |
|---|---|---|---|---|
| 4,072,398 A | * | 2/1978 | Larsen et al. | 385/111 |
| 4,759,604 A | * | 7/1988 | Utsumi et al. | 385/116 |
| 4,834,786 A | | 5/1989 | Yamauchi et al. | 65/3.12 |
| 4,871,383 A | | 10/1989 | Bachmann et al. | 65/3.12 |
| 4,978,377 A | | 12/1990 | Brehm et al. | 65/3.11 |
| 5,140,665 A | * | 8/1992 | Backer et al. | 385/126 |
| 5,689,578 A | | 11/1997 | Yamauchi et al. | 385/123 |
| 5,712,941 A | * | 1/1998 | Imoto et al. | 385/123 |
| 5,748,820 A | | 5/1998 | Le Marer et al. | 375/76 |
| 5,859,941 A | * | 1/1999 | Horita et al. | 359/127 |
| 5,944,867 A | | 8/1999 | Chesnoy et al. | 65/408 |
| 6,005,697 A | * | 12/1999 | Wu et al. | 359/117 |
| 6,041,154 A | * | 3/2000 | Ono et al. | 385/115 |
| 6,089,044 A | | 7/2000 | Hardy et al. | 65/408 |
| 6,154,594 A | * | 11/2000 | Fiacco et al. | 385/126 |
| 6,188,824 B1 | | 2/2001 | Teshima | 385/126 |
| 6,317,549 B1 | * | 11/2001 | Brown | 385/123 |

FOREIGN PATENT DOCUMENTS

| | | | |
|---|---|---|---|
| FR | 0 893 714 A1 | 1/1999 | G02B/6/16 |
| GB | 2355541 | 4/2001 | G02B/6/16 |
| WO | WO 99/05550 | 2/1999 | G02B/6/16 |
| WO | WO 00/16131 | 3/2000 | |

OTHER PUBLICATIONS

Bigo et al., "Transmission Over 3 X 100 Km of Terralight© Fiber", PD 1–2, European Conference on Optical Communications (ECOC) 2000.

"Analysis of Asymmetric Two–Core Single–Mode Optical Fibers for Subscriber Lines" by H. Yoshikawa et al., *Electronics & Communications of Japan*, Part 2, vol. 75, No. 3, 1992.

"Bandpass Filtering Effect in Tapered Assymmetrical Twin–Core Optical Fibres", by T. Tjugiarto et al, *Electronics Letters*, 10ᵗʰ Jun. 1993, vol. 29, No. 12.

International Search Report in PCT/US02/10338.

* cited by examiner

*Primary Examiner*—Robert H. Kim
*Assistant Examiner*—Richard Kim
(74) *Attorney, Agent, or Firm*—Myers Bigel Sibley & Sajovec (57) ABSTRACT

Multi-core optical fibers are provided in various embodiments of the present invention which include a plurality of cores. At least two cores of the plurality of cores have different associated mean propagation constants at a reference wavelength. The difference between the associated mean propagation constants may be selected to reduce cross-talk between the at least two cores as compared to cores having a same associated mean propagation constant. A primary coating of light absorbing material may be positioned between the cores to further reduce cross-talk. Also provided are methods for manufacturing the same and wavelength division multiplexing systems using the same.

40 Claims, 9 Drawing Sheets

OPTICAL FIBERS HAVING CORES WITH DIFFERENT PROPAGATION CONSTANTS, AND METHODS OF MANUFACTURING SAME

FIELD OF THE INVENTION

This invention relates to optical fibers, and, more particularly, to multi-core optical fibers and methods for manufacturing the same.

BACKGROUND OF THE INVENTION

With the expansion of telecommunications services, there has been a great demand for bandwidth on optical fibers. The information capacity of optical fibers can typically be enhanced by increasing the number of channels per fiber through wavelength division multiplexing (WDM) and/or by increasing bit rate using time-division multiplexing (TDM). This increase is limited eventually by the amount of information that can be carried on one fiber. The efficiency with which information is transmitted through a fiber is generally given by the following metric:

$$\text{Efficiency} = \text{Bit Rate/channel spacing} * 100 \quad (1)$$

where channel spacing is the separation between the nearest channels. Thus, an efficiency of 100% is achieved when bit rate is equal to the channel spacing. Generally, for currently available return to zero (RZ) and non-return to zero (NRZ), systems the proven efficiency is at about 40% although a spectral efficiency as high as 80% was reported in "Transmission Over 3×100 Km of Terralight™ Fiber," Bigo et al., PD 1–2, European Conference on Optical Communications (ECOC) 2000, Germany. The level of spectral efficiency that will be achieved will, typically, eventually be defined by single channel non-linearities and/or cross channel non-linearities.

An alternate way to increase the capacity of optical fibers is to increase the number of fiber counts. From this standpoint it is generally desirable to pack as many fibers as possible per unit area. This approach may be limited by a variety of factors. For example, the outer cladding plays a significant role although generally only in the case of fibers that are very weakly guided. The outer secondary coating typically protects the glass optical fiber and the fundamental mode from perturbations that are introduced during the cabling process. By reducing the cladding diameter and by getting many cores to share a single secondary coating it would appear to be possible to increase the packing density of cores per unit area in a cable. However, a problem is encountered if cores are too close as light can couple from one core to another. This cross-talk limits the ability to pack more cores in a fiber.

SUMMARY OF THE INVENTION

Multi-core optical fibers are provided in various embodiments of the present invention which include a plurality of cores. At least two cores of the plurality of cores have different associated mean propagation constants at a reference wavelength. The difference between the associated mean propagation constants may be selected to reduce cross-talk between the at least two cores as compared to cores having a same associated mean propagation constant. A primary coating of light absorbing material may be positioned between the cores to further reduce cross-talk. Also provided are methods for manufacturing the multi-core optical fibers of the present invention and wavelength division multiplexing systems using the same.

In further embodiments of the present invention, the difference between the associated mean propagation constants is selected to provide a difference between propagation constants of locally adjacent portions of the at least two cores of at least about 0.005% throughout a length of the fiber. The difference between the associated mean propagation constants may be at least about 0.05%. The separation between adjacent cores may be less than about 70 microns. The cross-talk between the cores may be below about −40 decibels (dB) at the reference wavelength and, in further embodiments, may be less than about −30 dB at the reference wavelength.

In other embodiments of the present invention, a primary coating is provided between the cores that reduces the cross-talk between the at least two cores. The cores may be a material selected from a group consisting of pure silica and silica doped to modify its index of refraction. The fiber also includes a cladding layer around the cores. The primary coating in various embodiments is between the cladding and ones of the cores. The cladding layer may be a material selected from a group consisting of pure silica and silica doped to modify its index of refraction. A secondary coating may be provided around the cladding layer.

In further embodiments of the present invention, the fiber has two cores. The two cores may each have a diameter of between about 5 and about 15 microns. The cladding layer may have a diameter of between about 120 and about 150 microns. The separation between the two cores may be less than about 70 microns. In various embodiments, the difference between the associated mean propagation constants of the two cores is provided by either a difference between diameters of the two cores or a difference between core deltas of the two cores.

In other embodiments of the present invention, the multi-core fiber includes seven cores. Adjacent ones of the seven cores have different associated propagation constants. The cores may each have a diameter of between about 4 and about 15 microns with a core separation of about 70 to about 125 microns or, in further embodiments, a core separation of less than or equal to about 70 microns. The cross-talk between adjacent cores in various embodiments may be less than about −30 decibels (dB) and may further be less than about −40 dB. The fiber may be an all glass cladding multi-core fiber or a hybrid glass/polymer cladding multi-core fiber.

In a further aspect of the present invention, methods are provided for manufacturing a multi-core fiber. A plurality of canes including a core material and a cladding material around the core material are formed. The plurality of canes are coupled to provide a preform. The multi-core fiber is drawn from the preform to provide a multi-core fiber having a plurality of cores having different associated propagation constants. The different propagation constants are provided by either a difference between diameters of at least adjacent ones of the plurality of cores or a difference between core deltas of at least adjacent ones of the plurality of cores.

The canes may be formed using an outside vapor deposition (OVD) process. A secondary coating may be provided around the drawn multi-core fiber. A primary coating of a lossy material may also be provided between the core material and the cladding material so that the drawn fiber includes a primary coating layer between ones of the plurality of cores.

In other embodiments of the present invention, the multi-core fiber is an all glass fiber. A plurality of bait rods including a core material are formed. The formed bait rods are positioned in a multi-chuck lathe in relative locations selected based on a desired distance between cores of the multi-core fiber. An overcladding layer is formed around the positioned bait rods to provide the preform. A central bait rod may be positioned in the multi-chuck lathe inside the positioned bait rods. The multi-core fiber may be a seven core fiber in which case the central bait rod may include a core material and a cladding material. In other embodiments, the central bait rod is a light absorbing glass. Forming an overcladding layer around the positioned bait rods may include concurrently oversooting the positioned bait rods and the central bait rod.

In further embodiments of the present invention, methods are provided for manufacturing a multi-core fiber. A plurality of canes including a core material and a cladding material around the core material are formed. Each of the plurality of canes is separately drawn to provide a plurality of single core fiber elements each including a core and a cladding layer, the cores having different associated propagation constants. The different propagation constants may be provided by either a difference between diameters of adjacent ones of the cores or a difference between core deltas of adjacent ones of the cores. The plurality of single core fiber elements are coupled to provide a multi-core fiber having a plurality of cores. The canes may be formed using outside vapor deposition (OVD).

A secondary coating may provided around the plurality of single core fiber elements. Also, a primary coating of a lossy material may be formed between the core material and the cladding material of each of the canes to provide the single core fiber elements with a primary coating layer between their core and their cladding layer.

In other embodiments of the present invention, the multi-core fiber is a hybrid fiber, In such embodiments, coupling the plurality of single core fiber elements to provide a multi-core fiber having a plurality of cores includes assembling the plurality of single core fiber elements in a desired geometry. A polymer filler is added to the assembled plurality of single core fiber elements. The single core fiber elements and polymer filler are extruded together to position polymer filler between ones of the single core fiber elements. A secondary coating may be provided around the extruded single core fiber elements and polymer filler.

In a further aspect of the present invention, wavelength division multiplexing (WDM) systems are provided. An optical input device receives data for transmission from one or more data sources. A multi-core optical fiber is coupled to the input device. The multi-core optical fiber has a first core that has a first associated mean propagation constant and a second core that has a second associated mean propagation constant different from the first mean propagation constant. An optical output device is provided that is configured to couple the multi-core optical fiber to a destination device.

The first core may define a first communication path between the input device and the output device and the second core may define a second communication path between the input device and the output device. Each communication path may have an associated plurality of transmission wavelengths and alternate ones of an available set of wavelengths for WDM communications may be provided to respective ones of the communication paths so as to increase a wavelength difference between adjacent transmission wavelengths of each of the associated plurality of transmission wavelengths. The transmission wavelength allocations may be provided while maintaining the number of transmission wavelengths supported between the input device and the output device.

The optical input device may be an optical input coupler. The optical output device may be an optical output coupler. A multi-port erbium-doped power amplifier (EDFA) may be coupled to the multi-core optical fiber by the output coupler.

DETAILED DESCRIPTION OF THE PREFERRED EMBODIMENT

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout. It will be understood that when an element such as a layer, region or substrate is referred to as being "on," "connected to" or "coupled to" another element, it can be directly on, directly connected to or directly coupled to the other element, or intervening elements also may be present. In contrast, when an element is referred to as being "directly on," "directly connected to" or "directly coupled to" another element, there are no intervening elements present. The present invention generally relates in various embodiments to multi-core fibers for use in order to increase capacity per unit area of the cable. In general, the cores, instead of being identical, are designed to be at least slightly different. The difference is provided to achieve a different propagation constant for ones of the different cores to potentially reduce cross-talk. Furthermore, a region may be provided around or between cores where some primary coating is placed to help in reducing the coupling between the cores even further. As used herein, the term "core" refers to the physical core of the fiber.

In order to further understanding of the present invention, mode coupling will now be described. Typically, when two fiber waveguides (or cores) are close together, there is a periodic exchange of power between the waveguides. If the waveguides are identical, generally, 100% of the power in waveguide #1 can be coupled to the other waveguide. The coupling distance generally depends on how close the waveguides are positioned relative to each other. It is desirable to avoid this coupling in a multi-core fiber (MCF) because the optical field propagating in one of the waveguides can induce cross-talk in the neighboring waveguide. If the nearest waveguides in a MCF are made slightly dissimilar in accordance with the present invention, i.e., they have different propagation constants, the phase matching for the power transfer generally becomes more difficult and the cross-talk may be reduced.

Consider the case of a dual core fiber. Let the refractive index of the waveguides by $n_i^2(x, y)$, $i=1,2$. Let the core separation be R and the refractive index of the total structure be $n^2(x,y)$. Suppose initial power at the input end of the waveguide #1 is $P_{10}$ and waveguide #2 is not excited. The optical power after propagating a distance of L in each of these waveguides is given by:

$$P_1(L)=P_{10}[\cos^2(\kappa L)+(\Delta/2\kappa)^2 \sin^2(\kappa L)] \quad (2)$$

$$P_2(L)=P_{10}\gamma_1^2 \sin^2(\kappa L)/\kappa^2 \quad (3)$$

where $\Delta$ is the difference in propagation constants and where $\kappa$ is the coupling coefficient, given by:

$$\kappa = \sqrt{(\Delta/2)^2 + \gamma_1\gamma_2} \quad (4)$$

$$\gamma_i = \frac{2\pi^2}{\lambda^2\beta_i} \int [n^2(x, y) - n_i^2(x, y)]\phi_1\phi_2 dxdy \text{ where } i = 1-2 \quad (5)$$

where $\lambda$ is the wavelength and $\phi$ is the mode field. The cross-talk can be defined as:

$$C=10 \log_{10}[P_2(L)/P_{10}]. \quad (6)$$

Figure 1:
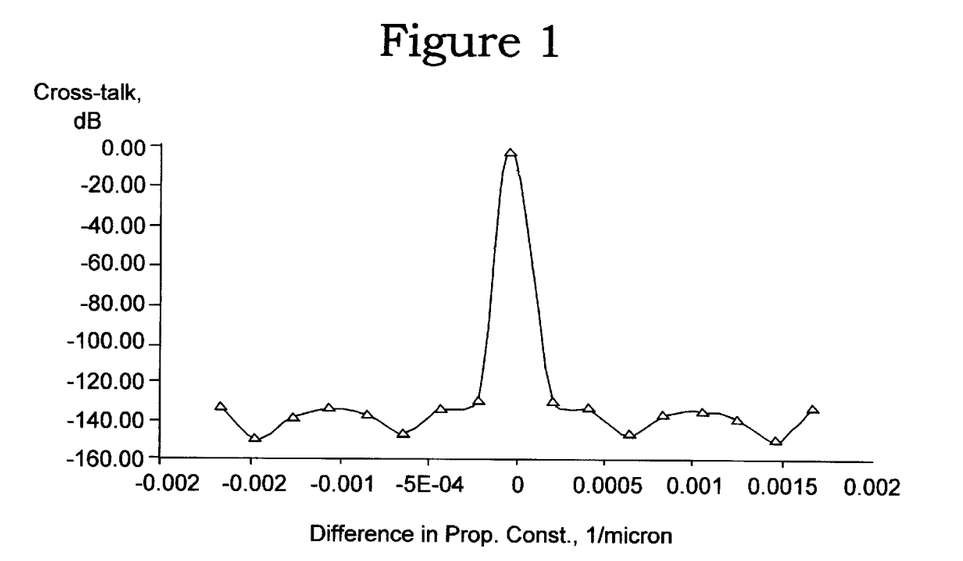
FIG. 1 is a graphical illustration of resonance in a dual core fiber.

FIG. 1 shows the cross-talk as a function of the difference in propagation constants, $\Delta$. The following parameters are assumed for FIG. 1: wavelength=1.55 microns (1550 nanometers (nm)), the core radius of waveguide #1=core radius of waveguide #2=4.2 microns, the core separation=70 microns, Length L=80 km, delta ($\Delta$) of waveguide #1 is fixed at 0.34% which corresponds to a refractive index profile of a standard single mode fiber and delta ($\Delta$) of waveguide #2 is varied. As can be seen in FIG. 1 when $\Delta=0$, there is a resonance. However, a relatively small amount of propagation constant detuning is sufficient to minimize the cross-talk.

Figure 2:
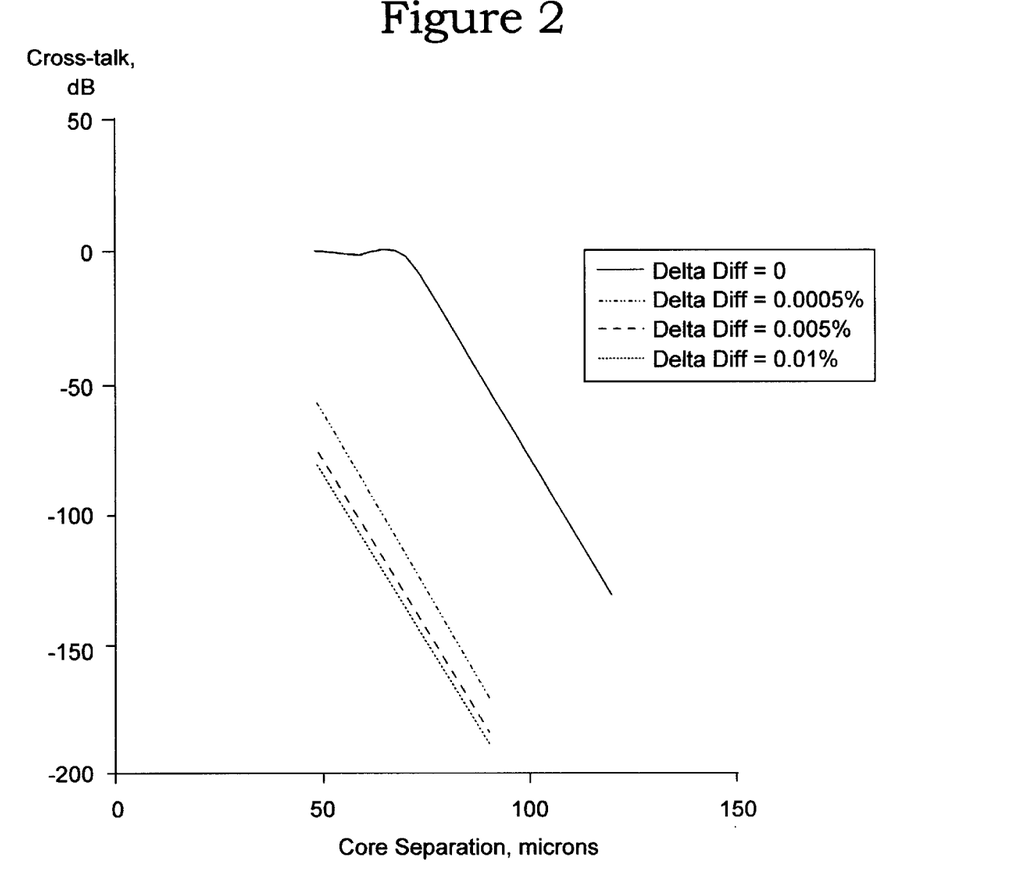
FIG. 2 is a graphical representation of cross-talk in a dual core fiber.

FIG. 2 illustrates the cross-talk as a function of core separation. The illustrated detuning is provided by making the two waveguides dissimilar. The difference in core delta of 0.0005% is theoretically sufficient to suppress the resonance. However, practical fibers with the same mean core delta (mean propagation constant) typically have variations in core delta of about 0.01%. So, it may be expected that, in the case of identical cores, the resonance at some points is suppressed by the random fluctuations in propagation constants but at other points along the length of the cores it may not be suppressed. In general, propagation constant varies as a function of propagation distance. If the propagation constants of two fibers become equal over even a few microns of propagation distance, it is generally sufficient to cause substantial cross-talk if the core-separation is less than about 70 microns. Thus, in the case of conventional fibers having identical cores, the core separation generally should exceed about 87 microns to have the cross-talk less than −30 dB at a reference wavelength of around 1550 nm and may further have a cross-talk less than about −40 dB.

Figure 3:
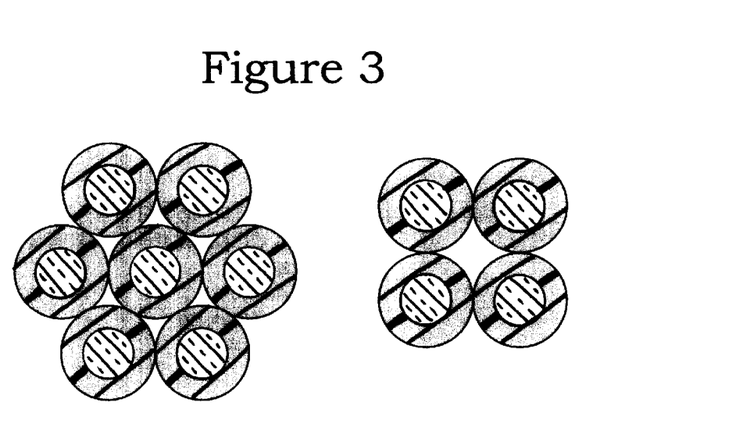
FIG. 3 is a side schematic illustration of multi-core fiber configurations illustrating a cross-sectional perspective on the relationship between the cores.
Figure 4:
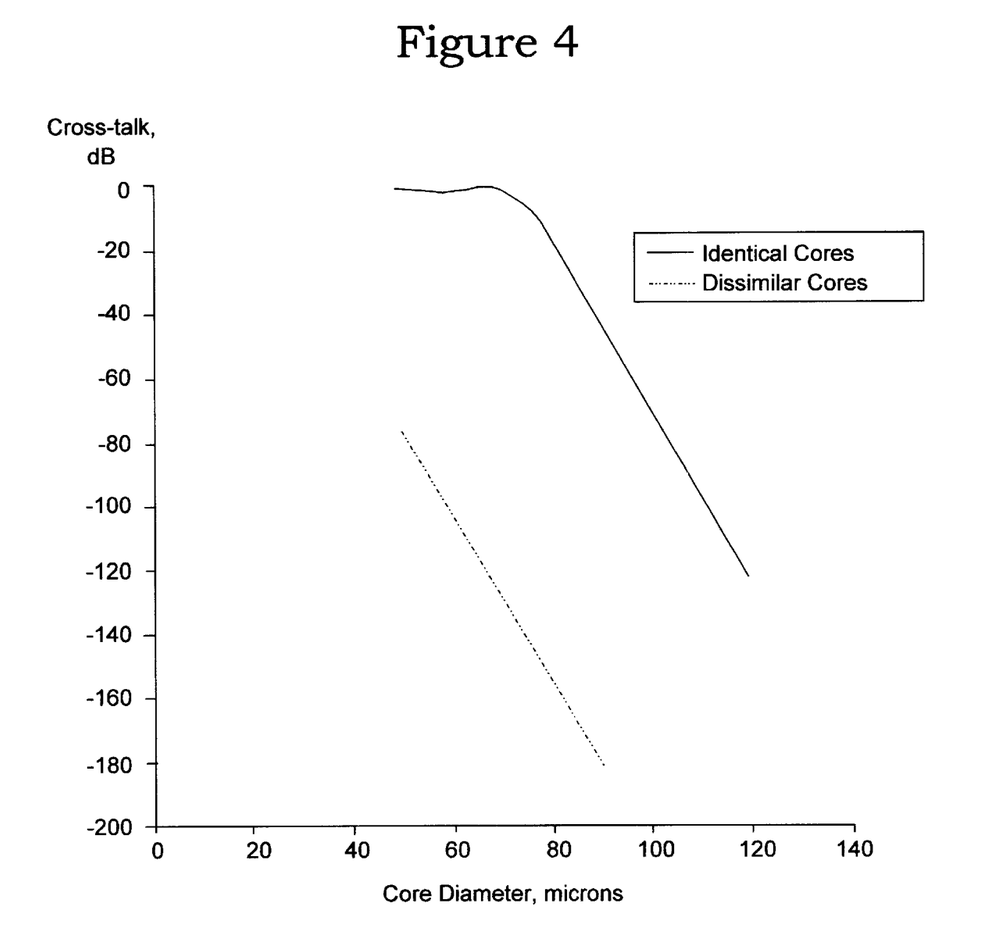
FIG. 4 is a graphical illustration of cross-talk in the central core of a seven (7) core multi-core fiber.

This analysis can be extended to greater numbers of cores. Each of the cores in a MCF could, for example, have arbitrary refractive index profiles. The adjacent fibers of a seven core and a four core MCF are shown in FIG. 3 where they touch each other. Therefore, the core separation is generally equal to the fiber diameter. FIG. 4 illustrates the cross-talk in the central core of a 7 core MCF as a function of core-separation. For conventional MCFs where cores are identical, the fiber diameter should generally be at least 90 microns to provide a cross-talk less than about −30 dB or less than about −40 dB at a reference wavelength of around 1550 nm. As shown in FIG. 4, for the case of dissimilar cores in accordance with the present invention, for an embodiment with a central core having a delta of 0.34%, and satellite cores having a delta of 0.32% and 0.36% alternately, improvements are obtained. In the case of dissimilar cores, the fiber diameter can, therefore, be significantly reduced while maintaining an acceptable level of cross-talk at a reference wavelength. The reference wavelength may correspond to the wavelengths used for transmission, which is typically 1550 nm currently.

MCF can generally be classified into two different categories: (i) all glass cladding, and (ii) hybrid glass/polymer cladding. The present invention may be beneficially applied to either type. Different processing methods may, however, be used for the two categories of MCF. Splicing of the fibers typically includes alignment of individual cores and can be adapted from known methods of mass fusion splicing in cables.

For a hybrid fiber, each fiber may consist of a core, cladding and the primary coating. Suppose the fiber diameter is D. This implies that the cladding diameter is D−(2*thickness of primary coating). In the cross-talk calculations shown in FIG. 4, the primary coating is not considered. Because the primary coating may absorb the optical field, the mode overlapping may be reduced and it is expected that the cross-talk will be less than that shown in FIG. 4.

An improvement factor may be determined to compare fibers in accordance with the present invention to conventional fibers. Assume the diameter of a standard fiber (inclusive of glass and coatings) is 250 microns. If 7 fibers are combined as shown in FIG. 3, the total area is $\pi*750^2/4$ miron$^2$. In the case of MCF with 7 cores, the total area is $\pi*(3*D+2*S)^2/4$ micron$^2$, where D is the fiber diameter and S is the thickness of the secondary coating. The improvement factor for MCF in accordance with the present invention may be defined as:

$$I.F. = \frac{750^2}{(3*D+2*S)^2} \quad (7)$$

Figure 5:
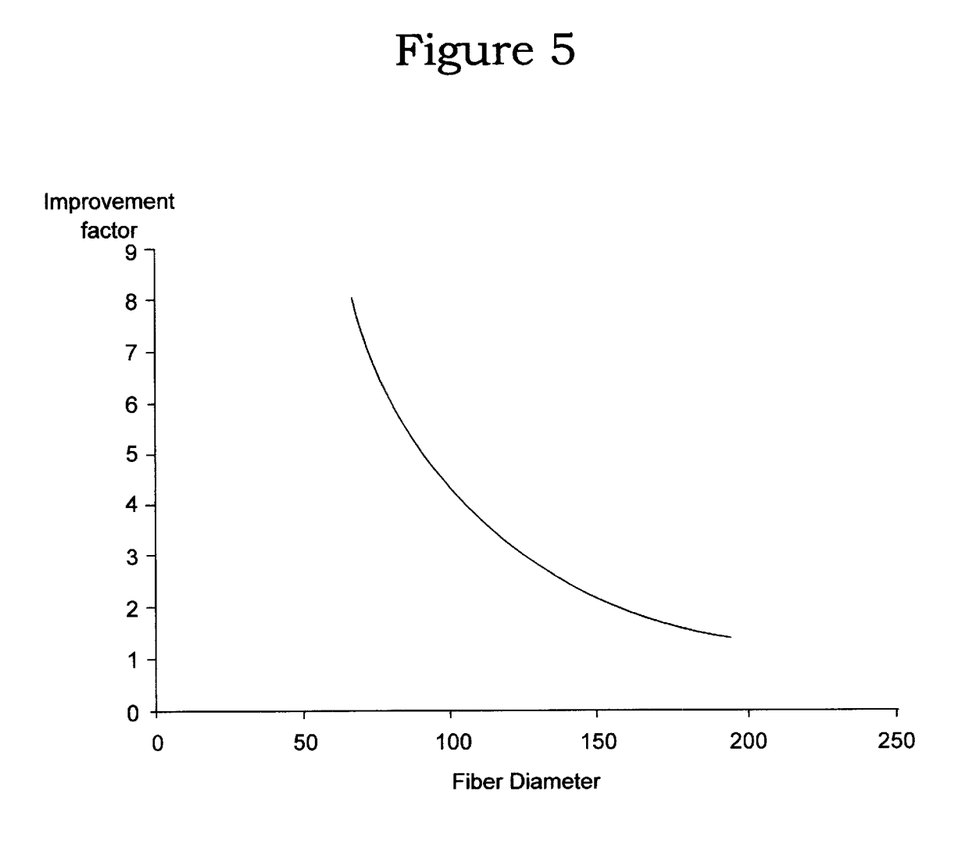
FIG. 5 is a graphical illustration of the improvement factor for packing fibers in accordance with embodiments of the present invention.

In FIG. 5, the improvement factor is plotted as a function of fiber diameter. S is assumed to be 27.5 microns. Thus, for a design where D=70 microns, fibers can be packed 8 times more densely than the conventional fiber design.

Figure 6A:
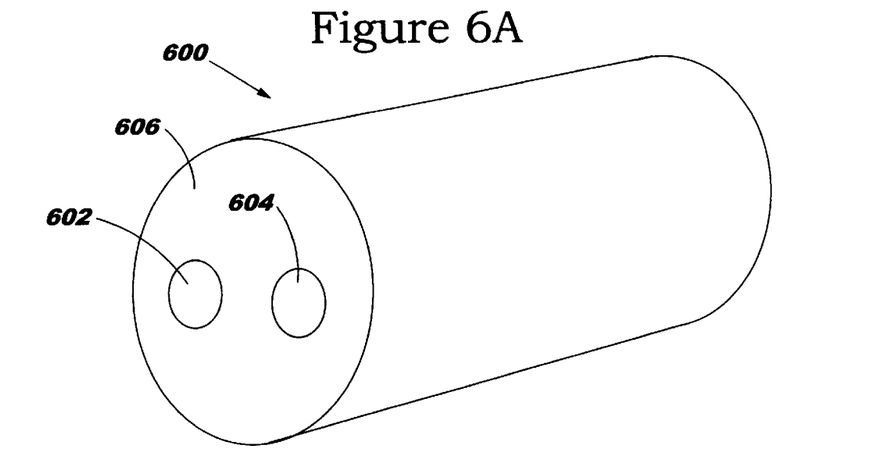
FIGS. 6A–6C are perspective views illustrating multi-core optical fibers in accordance with various embodiments of the present invention.

The present invention will now be further described with reference to the perspective view illustrations of various embodiments of multi-core optical fibers (MCF) in accordance with the present invention. Referring first to FIG. 6A, a two core multi-core fiber 600 is illustrated. The multi-core fiber 600 includes a first core 602 and a second core 604 positioned within and displaced from each other in a cladding layer 606. Core 604 has a different associated mean propagation constant than core 602 at a reference wavelength. Preferably, the mean propagation constants are selected to be different at a reference wavelength corresponding to a wavelength to be used for transmission, such as a 1550 nm.

In various embodiments, the associated mean propagation constants of the cores 602, 604 are selected to reduce cross-talk between the cores 602, 604 as compared to cores having a same associated mean propagation constant. In further embodiments, the difference between the associated mean propagation constants is selected to provide a difference between propagation constants of locally adjacent portions of the cores 602, 604 along the length of the MCF 600 of at least about 0.005% throughout the length of the MCF 600.

Depending upon the variability of cores, the difference between the associated mean propagation constants may be selected to be at least about 0.05%. For currently available fiber manufacturing technologies such a difference in the mean propagation constants would be expected to provide at least about 0.005% difference between propagation constants of locally adjacent portions of the cores 602, 604 through the length of the MCF 600. The difference between the associated mean propagation constants of the cores 602, 604 may be provided, in various embodiments of the present invention, by a difference between diameters of the cores 602, 604 and/or a difference between the core deltas of the cores 602, 604.

Figure 6B:
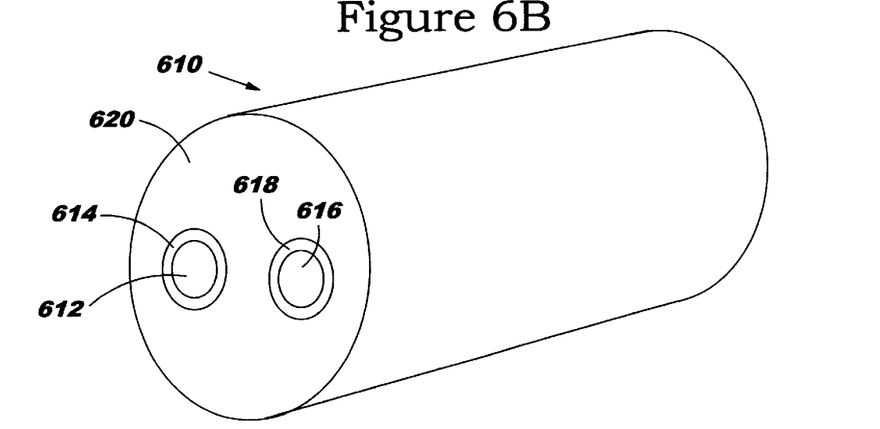
Figure 6C:
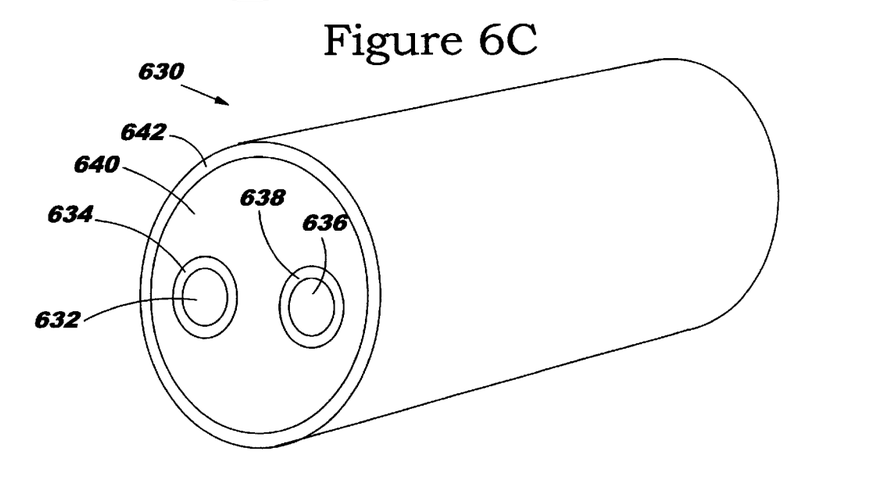

While shown as two cores in FIGS. 6A–6C, it is to be understood that the present invention applies to multi-core fibers including more than two cores, such as seven (7) core fibers. In fibers with a greater number of cores, it will be understood that characteristics of adjacent cores may be selected to control cross-talk among cores which are positioned in relatively closest proximity to each other and are, therefore, more susceptible to cross-talk. In various embodiments, the respective cores 602, 604 are provided a separation between the cores 602, 604, as measured from center line to center line, of less than about 70 microns. In such embodiments, the cross-talk between the at least two cores may be less than about −40 decibels (dB) at the reference wavelength.

The cores 602, 604 may comprise a material selected from a group consisting of a glass such as pure silica and silica doped to modify its index of refraction. Examples of suitable dopant materials include $GeO_2$, F, $Cl_2$, $TiO_2$, $P_2O_5$, $B_2O_3$, $Al_2O_3$ and other suitable dopant materials affecting a refractive index as will be understood by those of skill in the art. The cladding layer 606 around the cores 602, 604 may comprise a material selected from the same group but with a doping provided so as to result in an index of refraction different from the core, for example, F, $B_2O_3$ or $GeO_2$. In further embodiments, the cores 602, 604 each have a diameter of between about 5 microns and about 15 microns. The cladding layer 606 around the cores may have a diameter of between about 120 microns and about 150 microns. The separation between the cores 602, 604 may be then less than about 70 microns.

Referring now to FIG. 6B, a multi-core fiber 610 in accordance with further embodiments of the present invention is illustrated. The MCF 610 includes a first core 612 and a second core 616 each having different associated mean propagation constants as described above with reference to FIG. 6A. A cladding layer 620, such as described above with reference to the cladding layer 606, is also provided. Furthermore, for the embodiments illustrated in FIG. 6B, each of the cores 612, 616 includes a primary coating 614, 618 around the respective cores that may reduce the cross-talk between the cores 612, 616. Note that while the primary coating 614, 618 is shown as surrounding the cores 612, 616 in the embodiments illustrated in FIG. 6B, the primary coating need not surround the cores but may instead, for example, be positioned between the respective cores 612, 616 so as to reduce the cross-talk between the cores 612, 616. The primary coating may comprise a material such as urethane acrylate or other light absorbing (lossy) material.

Referring now to FIG. 6C, a two core multi-core fiber 630 according to further embodiments of the present invention is illustrated. As with the embodiments of FIG. 6B, the MCF 630 includes two cores 632, 636 having different associated mean propagation constants. A primary coating layer 634, 638 is provided between the cores 632, 636 which may further reduce cross-talk between the cores 632, 636. A cladding layer 640 surrounds the cores 632, 636 with the primary coating 634, 638 being positioned between the cores 632, 636 and at least a portion of the cladding layer 640. The materials for the core 632, 636, the primary coating 634, 638 and the cladding layer 640 may be as described previously with reference to FIGS. 6A and 6B.

For the embodiments shown in FIG. 6C, a secondary coating layer 642 is also provided around the cladding layer 640. The secondary coating 642 may, for example, provide a protective coating to the MCF 630. The secondary coating 642 may be a material selected from a group consisting of urethane acrylate or other suitable material.

While each of the multi-core fibers 600, 610, 630 in FIGS. 6A–6C is illustrated as a two core fiber, it is to be understood that more cores may be included and two cores are used in the illustrative figures to simplify understanding of the present invention. In particular embodiments of the present invention, seven cores are provided so that the respective fibers comprise a seven core multi-core fiber. In such embodiments, at least adjacent ones of the seven cores have different associated propagation constants. For example, in particular embodiments, the cores may each have a diameter of between about 4 and about 15 microns with a core separation of about 70 to about 125 microns or, in further embodiments, a core separation of less than or equal to about 70 microns. The cross-talk between respective ones of the fibers of a multi-core fiber in accordance with the present invention may be less than about −30 dB and may further be less than about −30 dB at a reference wavelength (for example, 1550 nm), the propagation constants may be 0.005% or more and the core deltas may be 0.05% or more. Furthermore, as noted above, in various embodiments of the present invention, the multi-core fiber may comprise an all glass cladding multi-core fiber or a hybrid glass/polymer cladding multi-core fiber.

Figure 7:
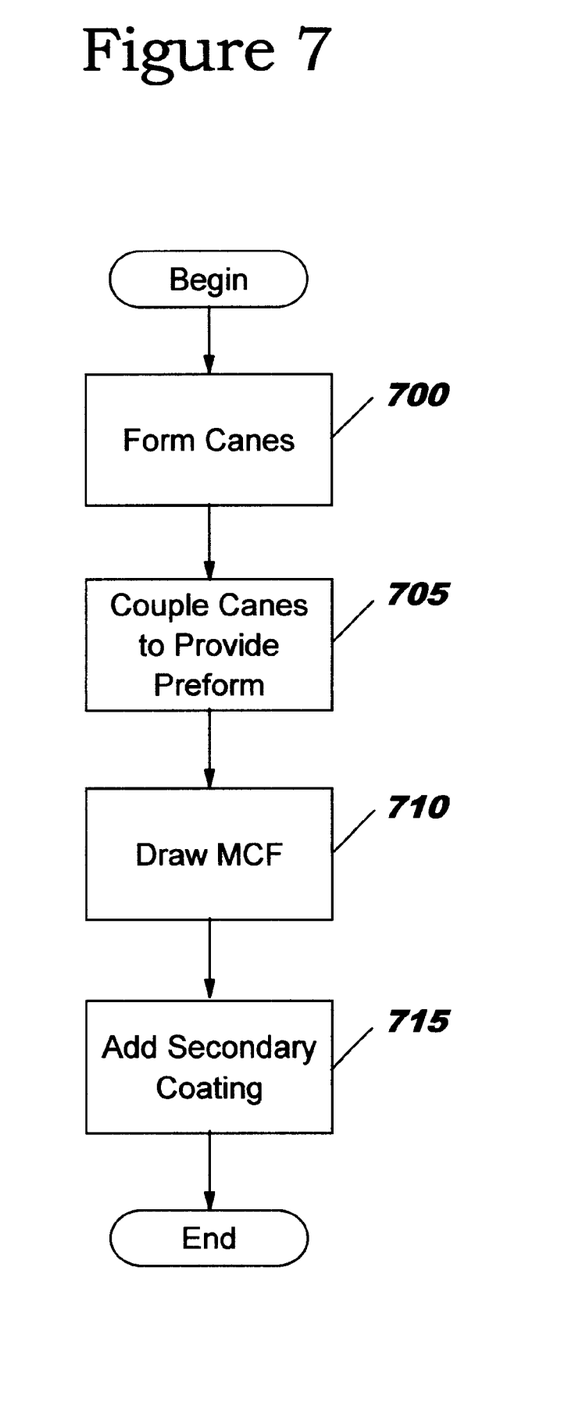
FIG. 7 is a flowchart illustrating operations for manufacturing a glass cladding multi-core fiber in accordance with embodiments of the present invention.

Referring now to the flowchart illustration of FIG. 7, operations related to methods for manufacturing a multi-core fiber will now be further described. As shown in FIG. 7, operations begin at block 700 with the forming a plurality of canes including a core material and a cladding material around the core material. The formed canes are coupled to provide a preform (block 705). The multi-core fiber is drawn from the preform so as to provide a multi-core fiber having a plurality of cores which have different associated mean propagation constants (block 710). As described previously, the different mean propagation constants may be provided, for example, by a difference between diameters of at least adjacent ones of a plurality of cores or a difference between core deltas of at least adjacent ones of the plurality of cores. In various embodiments, a secondary coating may also be provided around the drawn multi-core fiber (block 715).

Operations related to forming the canes at block 700 may consist of outside vapor deposition (OVD) forming of the canes. Alternative forming procedures suitable for use with the present invention may include, for example, vapor axial deposition (VAD), modified chemical vapor deposition (MCVD), plasma chemical vapor deposition (PCVD) or other suitable procedure as will be understood by those of skill in the art. Furthermore, operations for forming the cane at block 700 may also include forming a primary coating of a lossy material between the core material and the cladding material of respective adjacent ones of the canes. In various embodiments, a primary coating layer may be provided extending around each of the plurality of cores as shown in FIGS. 6B and 6C.

Figure 8:
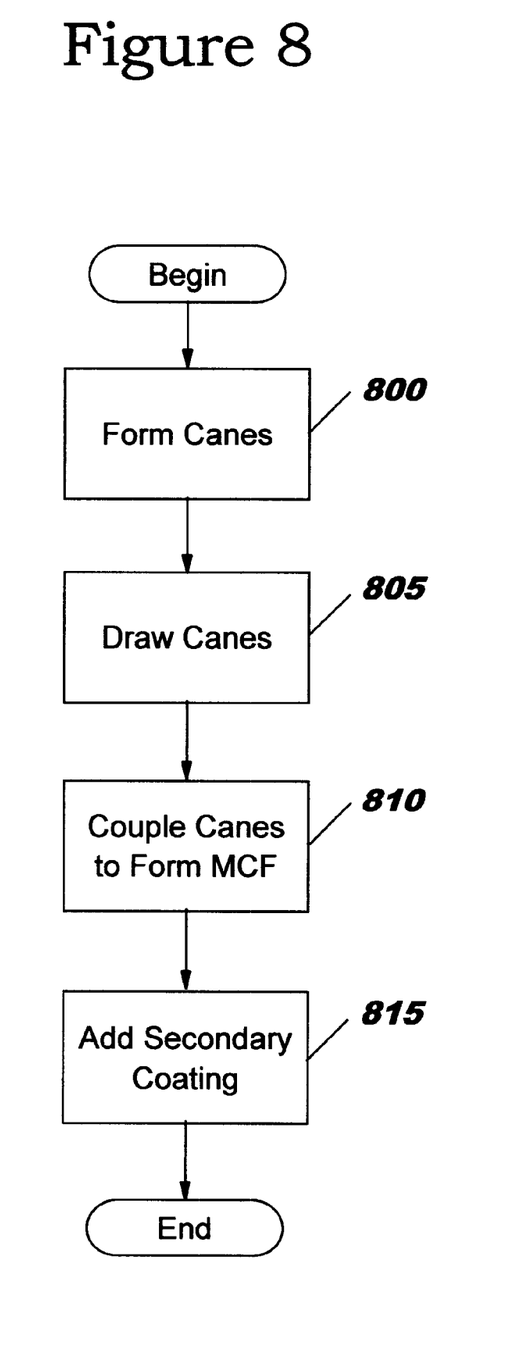
FIG. 8 is a flowchart illustrating operations for manufacturing a glass cladding multi-core fiber in accordance with further embodiments of the present invention.

Referring now to FIG. 8, operations according to further embodiments of the present invention for manufacturing a multi-core fiber will be further described. Operations begin at block 800 with the forming of a plurality of canes including a core material and a cladding material around the core material. The canes are separately drawn to provide a plurality of single core fiber elements each including a core and a cladding layer (block 805). At least two of the cores have different associated propagation constants which may be provided, for example, by a difference between diameters of at least adjacent ones of the cores or a difference between core deltas of at least adjacent ones of the cores. The plurality of drawn single core fiber elements are coupled to provide a multi-core fiber having a plurality of cores in accordance with the present invention (block 810). As shown in FIG. 8, in particular embodiments, a secondary coating may be provided around the plurality of coupled single core fiber elements (block 815). Furthermore, as with the embodiments illustrated in FIG. 7, a primary coating of a lossy material may also be provided between the core material and the cladding material of respective ones of the canes and outside vapor deposition or other means may be used for forming the canes.

Various embodiments of methods for manufacturing multi-core fibers will now be further described. As different approaches to fiber processing for all glass clad MCF and for hybrid MCF may be desired, they will be described separately herein. Various approaches to processing for all glass clad MCF will be generally described with reference to a multi-chuck lathe process and an alternative stack and draw process. To simplify the description herein, the description of these processes will be based on an OVD laydown process but it is to be understood that alternative approaches may be utilized.

Figure 9:
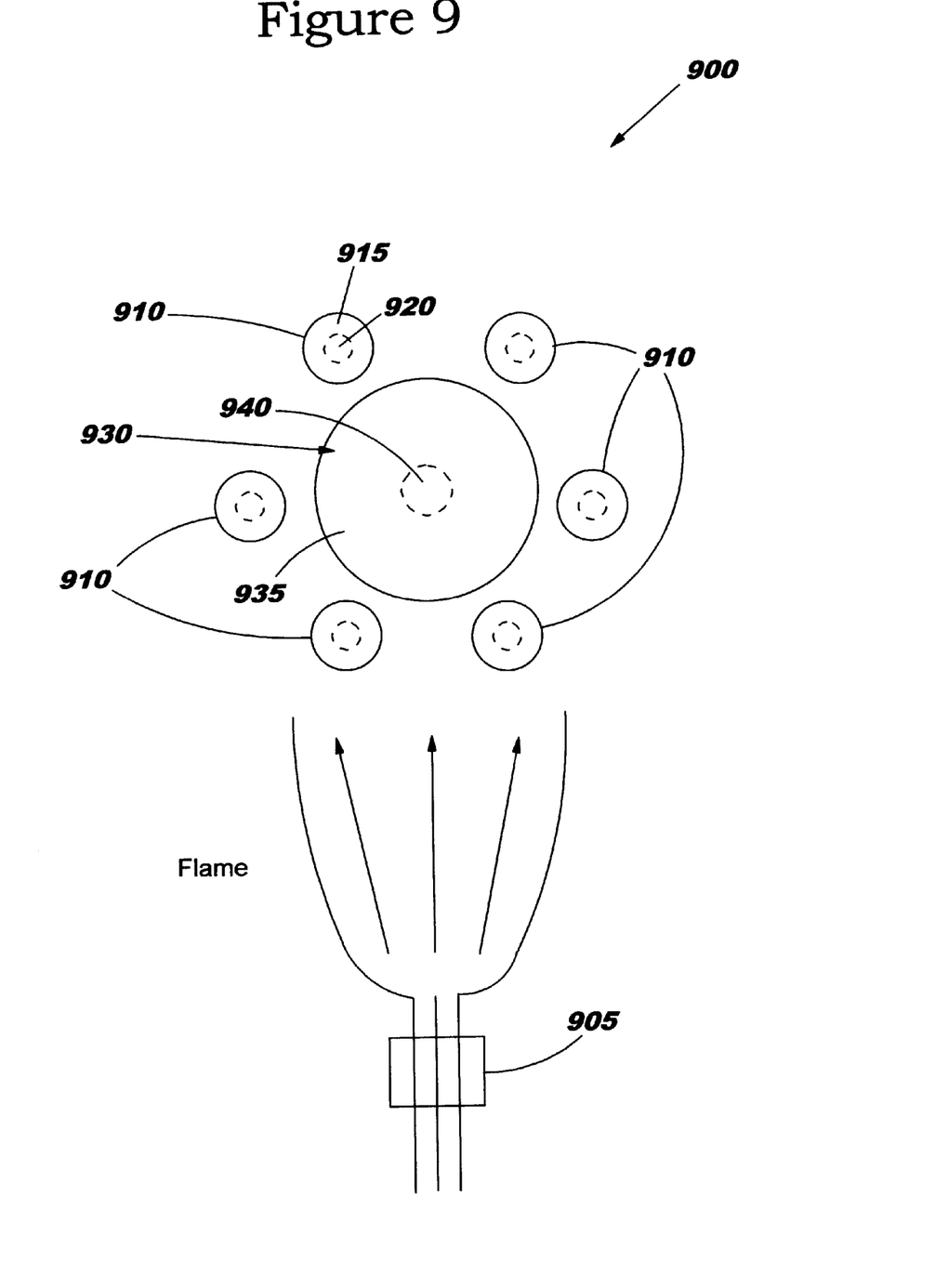
FIG. 9 is a schematic diagram illustrating a multi-chuck lathe process suitable for use in manufacturing multi-core optical fibers in accordance with embodiments of the present invention.

For the multi-chuck lathe process, the OVD laydown process may be modified to incorporate the use of multiple canes. The chuck may be designed to hold multiple canes adjusted to the correct cane diameters at desired locations. A central bait rod can be a central core if one is present in the multi-core design and, if there is no core in the center of the fiber, a solid silica rod can serve as the primary bait for high capture efficiency. A light absorbing material also may be used as the central core to provide a lossy primary layer between cores. The satellite cores could be laid out around the primary bait (central core) as satellite baits. Overclad soot can then be deposited on all of them concurrently. A cross-section of the (a) primary and (b) satellite baits, as laid out for a 7 core structure as an example, are shown in FIG. 9. Relative diameters of the primary and satellite baits may be used as a variable affecting the dimensions and multiplicity permitted.

As shown in FIG. 9, a flame oversooting mechanism 905 may be utilized in the laydown process for deposition on the central bait cane 930 and the satellite bait canes 910. For the embodiments illustrated of a seven core multi-core fiber in FIG. 9, the canes 910 loaded into the multi-chuck lathe for the OVD laydown process include both a core material 920 and a cladding layer 915. Similarly, the central core 930 includes both a core material 940 and a cladding material 935. However, it is to be understood that the canes may comprise only a core material at the time of loading into the multi-chuck lathe with the cladding all deposited during the OVD laydown process.

Various methods are known to reduce viscosity of overclad to match the core (e.g., more chlorine). Such methods may help in uniform hole closure in consolidation or redraw. Overclad recipes with appropriate radial soot density variations may also facilitate more uniform hole closure. The multi-chuck process may provide an all glass approach and the selects can occur in the early stages of manufacturing before draw. This approach may also be readily scaled up. However, modification to laydown equipment may be required and some multi-core geometrical arrangements may be difficult to provide.

Alternatively, a stack and draw process may be used with an all glass cladding MCF. The individual core canes may be stacked together, for example, inside a silica tube, and the interstitial space may be filled with additional silica rods and stuffed glass. The entire assembly may then be drawn together to produce a multi-core fiber. This process may offer more flexibility than the multi-chuck lathe in terms of achievable geometries. However, it may be more labor intensive and may result in lower selects.

For a hybrid glass/polymer MCF, the individual cores may be partially clad and drawn to smaller diameters with the primary coating alone. They may then be assembled in the desired geometry and extruded together with a polymer filler. A secondary coating may be applied around the assembly to provide the MCF. This technique may permit the characterization of the individual fibers for optical attributes before assembly, and may also enable ease of splicing as the individual cores can be separated out by removing the coating alone. In addition, no major equipment changes may be required to the OVD process and assembly of individual cores may be automated.

In further aspects of the present invention, wavelength division multiplexing (WDM) systems utilizing the novel multi-core fibers of the present invention are provided. The multi-core fibers of the present invention may, thus, play a role in optical networks by advantageously providing an enhancement to the fiber count per unit area which may facilitate space division multiplexing. Such inventive multi-core fibers may also enhance the quality of transmission in such a WDM system.

Figure 10:
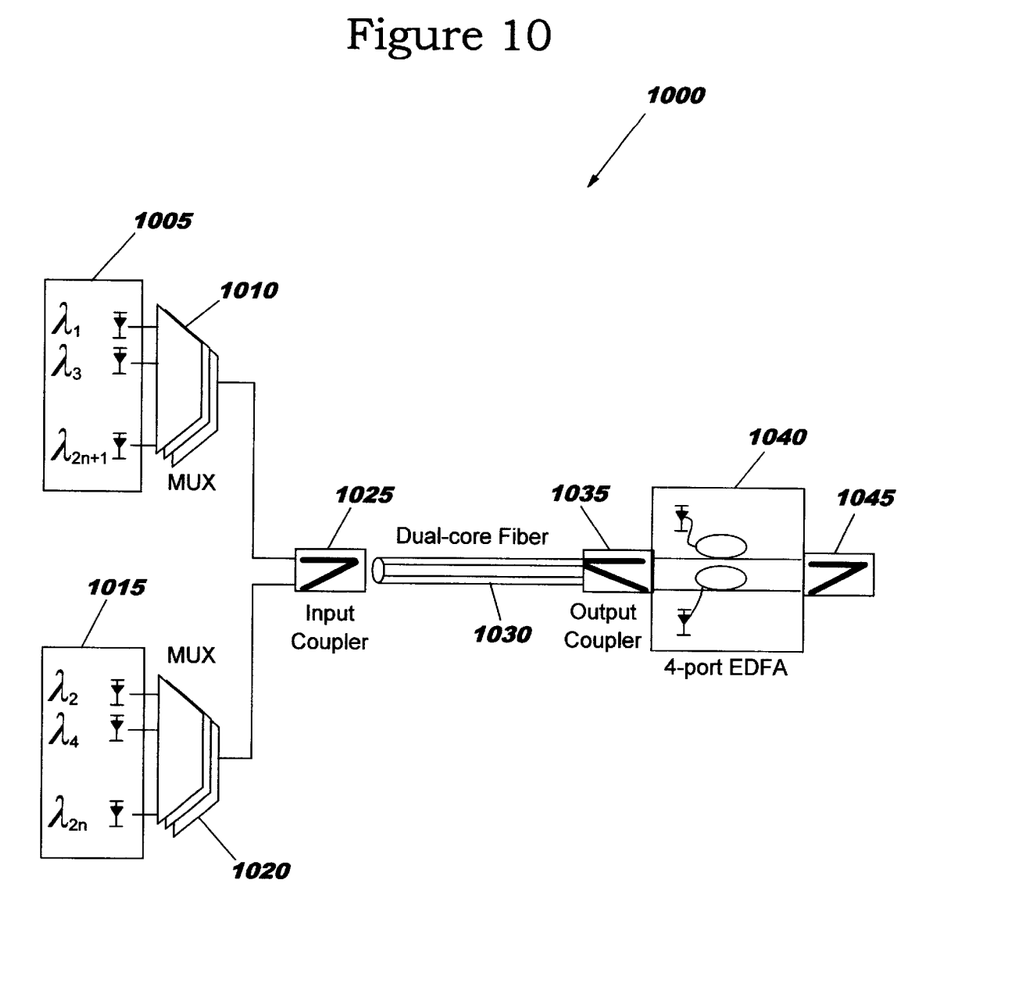
FIG. 10 is a block diagram illustrating a wavelength division multiplexing (WDM) system according to embodiments of the present invention.

An exemplary WDM system 1000 in accordance with embodiments of the present invention is illustrated in FIG. 10. A first transmitter source 1005 is coupled through a multiplexer 1010 to an optical input device, shown as an optical input coupler 1025 in FIG. 10. A second transmitter device 1015 is coupled to the input coupler 1025 through a multiplexer 1020. The input coupler 1025 receives the data for transmission from the transmitter data sources 1005, 1015 and couples the signals to the multi-core fiber 1030, shown as a dual core fiber 1030 in FIG. 10, having cores with different associate mean propagation constants as described above. The dual core fiber 1030 carries the signals on its respective cores between the input coupler 1025 and the optical output device 1035, shown as an output coupler 1035 in FIG. 10. The output coupler 1035 couples the dual core fiber 1030 to a destination device.

The first core of the dual core fiber 1030 thus defines a first communication path between the input coupler 1025 and the output coupler 1025 and the second core defines a second communication path. Each such communication path has an associated plurality of transmission wavelengths utilized in the WDM system 1000. More particularly, in particular embodiments of the present invention, alternate ones of an available set of wavelengths for WDM communications are provided to respective ones of the communication paths so as to increase the wavelength difference between adjacent transmission wavelengths of each of the associated plurality of transmission wavelengths. This division across multiple cores may be provided while maintaining the number of transmission wavelengths supported between the input coupler 1025 and the output coupler 1035. Note that, as shown in FIG. 10, a multi-port erbium-doped power amplifier (EDFA) is coupled to the dual core fiber 1030 by the output coupler 1035 to provide an interface through the coupling device 1045 to a destination device.

Thus, use of the multi-core fibers according to embodiments of the present invention may allow, for example, odd and even channels to be separately multiplexed and propagate through different cores. For example, a 10 gigabit per second (Gb/s), 32 channel WDM system at a 25 gigahertz (GHz) channel separation could be split into odd and even channels. The frequency/wavelength separation between the neighboring channels in each core may then result in a 50 GHz frequency separation. Due to the increase in frequency separation, cross channel penalties, such as cross-phase modulation and four wave mixing, may be reduced. Thus, by using separate cores feeding an EDFA, four wave mixing impairments sometimes found in EDFA may also be reduced.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A multi-core optical fiber comprising:
    a plurality of cores, at least two cores of the plurality of cores having different associated mean propagation constants at a reference wavelength and wherein a separation between adjacent ones of the plurality of cores is about 70 microns to about 125 microns.

2. The fiber of claim 1 wherein a difference between the associated mean propagation constants is selected to reduce cross-talk between the at least two cores as compared to cores having a same associated mean propagation constant.

3. The fiber of claim 2 wherein the difference between the associated mean propagation constants is selected to provide a difference between propagation constants of locally adjacent portions of the at least two cores of about 0.005% throughout a length of the fiber.

4. The fiber of claim 2 wherein the difference between the associated mean propagation constants is about 0.05%.

5. The fiber of claim 2 wherein the cross-talk between the at least two cores is less than about −30 decibels (dB) at the reference wavelength.

6. The fiber of claim 2 further comprising a primary coating between the at least two cores that reduces the cross-talk between the at least two cores.

7. The fiber of claim 6 wherein the at least two cores comprise a material selected from a group consisting of pure silica and silica doped to modify its index of refraction and wherein the fiber further comprises a cladding layer around the at least two cores and between the primary coating and each of the at least two cores, the cladding layer comprising a material selected from a group consisting of pure silica and silica doped to modify its index of refraction.

8. The fiber of claim 2 wherein the at least two cores comprise a material selected from a group consisting of pure silica and silica doped to modify its index of refraction and wherein the fiber further comprises a cladding layer around the at least two cores comprising a material selected from a group consisting of pure silica and silica doped to modify its index of refraction.

9. The fiber of claim 8 further comprising a secondary coating around the cladding layer.

10. The fiber of claim 9 wherein the at least two cores comprise two cores and wherein the two cores each have a diameter of between about 5 and about 15 microns and wherein the cladding layer has a diameter of between about 120 and about 150 microns.

11. The fiber of claim 10 wherein the difference between the associated mean propagation constants of the two cores is provided by a difference between core deltas of the two cores.

12. The fiber of claim 2 wherein the difference between the associated mean propagation constants of the at least two cores is provided by a difference between core deltas of the at least two cores.

13. The fiber of claim 2 wherein the plurality of cores comprises seven cores and the fiber comprises a seven core multi-core fiber and wherein at least adjacent ones of the seven cores have different associated propagation constants.

14. The fiber of claim 13 wherein the plurality of cores have a core diameter of from about 4 to about 15 microns.

15. The fiber of claim 13 wherein a cross-talk between adjacent ones of the at least two cores is less than about −40 decibels (dB) at the reference wavelength.

16. The fiber of claim 1 wherein the fiber comprises an all glass cladding multi-core fiber or a hybrid glass/polymer cladding multi-core fiber.

17. A method for manufacturing a multi-core fiber comprising:
    forming a plurality of canes including a core material and a cladding material around the core material;
    coupling the plurality of canes to provide a preform; and
    drawing the multi-core fiber from the preform to provide a multi-core fiber having a plurality of cores having different associated propagation constants, and wherein a separation between adjacent ones of the plurality of cores is about 70 microns to about 125 microns.

18. The method of claim 17 wherein the different propagation constants are provided by a difference between core deltas of at least adjacent ones of the plurality of cores.

19. The method of claim 18 wherein forming a plurality of canes including a core material and a cladding material around the core material comprises outside vapor deposition (OVD) forming the plurality of canes.

20. The method of claim 18 further comprising providing a secondary coating around the drawn multi-core fiber.

21. The method of claim 18 wherein forming a plurality of canes further comprises forming a primary coating of a lossy material between the core material and the cladding material and wherein drawing the multi-core fiber further provides a primary coating layer between ones of the plurality of cores.

22. The method of claim 18 wherein the multi-core fiber comprises an all glass fiber and wherein the steps of forming a plurality of canes including a core material and a cladding material around the core material and coupling the plurality of canes to provide a preform comprise the following steps:

forming a plurality of bait rods comprising a core material;

positioning the formed bait rods in a multi-chuck lathe in relative locations selected based on a desired distance between cores of the multi-core fiber; and forming an overcladding layer around the positioned bait rods to provide the preform.

23. The method of claim 22 wherein the steps of forming a plurality of canes including a core material and a cladding material around the core material and coupling the plurality of canes to provide a preform further comprise the step of positioning a central bait rod in the multi-chuck lathe inside the positioned bait rods.

24. The method of claim 23 wherein the multi-core fiber comprises a seven core fiber and wherein the central bait rod comprises a core material and a cladding material.

25. The method of claim 23 wherein the central bait rod comprises a light absorbing glass.

26. The method of claim 23 wherein the step of forming an overcladding layer around the positioned bait rods to provide the preform comprises concurrently oversooting the positioned bait rods and the central bait rod.

27. A method for manufacturing a multi-core fiber comprising:

forming a plurality of canes including a core material and a cladding material around the core material;

separately drawing each of the plurality of canes to provide a plurality of single core fiber elements each including a core and a cladding layer, the cores having different associated propagation constants, the different propagation constants being provided by a difference between core deltas of at least adjacent ones of the cores; and coupling the plurality of single core fiber elements to provide a multi-core fiber having a plurality of cores.

28. The method of claim 27 wherein forming a plurality of canes including a core material and a cladding material around the core material comprises outside vapor deposition (OVD) forming the plurality of canes.

29. The method of claim 27 wherein coupling the plurality of single core fiber elements further comprises providing a secondary coating around the plurality of single core fiber elements.

30. The method of claim 27 wherein OVD forming a plurality of canes further comprises forming a primary coating of a lossy material between the core material and the cladding material of each of the canes and wherein the plurality of single fiber core elements further comprises a primary coating layer between its core and its cladding layer.

31. The method of claim 27 wherein the multi-core fiber comprises a hybrid fiber and wherein the step of coupling the plurality of single core fiber elements to provide a multi-core fiber having a plurality of cores comprises the steps of:

assembling the plurality of single core fiber elements in a desired geometry;

adding a polymer filler to the assembled plurality of single core fiber elements; and extruding the single core fiber elements and polymer filler together to position polymer filler between ones of the single core fiber elements.

32. The method of claim 31 wherein the step of extruding is followed by the step of providing a secondary coating around the extruded single core fiber elements and polymer filler.

33. A wavelength division multiplexing (WDM) system comprising:

an optical input device that receives data for transmission from at least one data source;

a multi-core optical fiber coupled to the input device, the multi-core optical fiber having a first core that has a first associated mean propagation constant and an adjacent second core that has a second associated mean propagation constant different from the first mean propagation constant and wherein a separation between the first core and the second core is about 70 microns to about 125 microns; and an optical output device configured to couple the multi-core optical fiber to a destination device.

34. The system of claim 33 wherein the first core defines a first communication path between the input device and the output device and the second core defines a second communication path between the input device and the output device, each communication path having an associated plurality of transmission wavelengths, wherein alternate ones of an available set of wavelengths for WDM communications are provided to respective ones of the communication paths so as to increase a wavelength difference between adjacent transmission wavelengths of each of the associated plurality of transmission wavelengths while maintaining the number of transmission wavelengths supported between the input device and the output device.

35. The system of claim 34 wherein the optical input device comprises an optical input coupler and wherein the optical output device comprises an optical output coupler.

36. The system of claim 35 further comprising a multi-port erbium-doped power amplifier (EDFA) coupled to the multi-core optical fiber by the output coupler.

37. A multi-core optical fiber comprising:

a plurality of cores, at least two cores of the plurality of cores having different associated mean propagation constants at a reference wavelength and wherein the difference between the associated mean propagation constants is selected to provide a difference between propagation constants of locally adjacent portions of the at least two cores of about 0.005% throughout a length of the fiber.

38. The fiber of claim 37 wherein the difference between the associated mean propagation constants of the two cores is provided by a difference between core deltas of the two cores.

39. A multi-core optical fiber comprising:

a plurality of cores, at least two cores of the plurality of cores having different associated mean propagation constants at a reference wavelength and wherein the difference between the associated mean propagation constants is about 0.05%.

40. The fiber of claim 39 wherein the difference between the associated mean propagation constants of the two cores is provided by a difference between core deltas of the two cores.

* * * * *